US012664962B2

(12) United States Patent
Suzuki

(10) Patent No.: US 12,664,962 B2

(45) Date of Patent: Jun. 23, 2026

(54) KEYBOARD DEVICE

(71) Applicant: KAWAI MUSICAL INSTRUMENTS MANUFACTURING CO., LTD., Hamamatsu (JP)

(72) Inventor: Akihiro Suzuki, Hamamatsu (JP)

(73) Assignee: KAWAI MUSICAL INSTRUMENTS MANUFACTURING CO., LTD., Hamamatsu (JP)

( * ) Notice: Subject to any disclaimer, the term of this patent is extended or adjusted under 35 U.S.C. 154(b) by 305 days.

(21) Appl. No.: 18/587,557

(22) Filed: Feb. 26, 2024

(65) Prior Publication Data

US 2024/0290309 A1 Aug. 29, 2024

(30) Foreign Application Priority Data

Feb. 27, 2023 (JP) ................................ 2023-028594
Mar. 1, 2023 (JP) ................................ 2023-031063

(51) Int. Cl.
*G10H 1/34* (2006.01)

(52) U.S. Cl.
CPC .................................. *G10H 1/344* (2013.01)

(58) Field of Classification Search
CPC ........... G10H 1/344; G10H 1/346; G10C 3/12
USPC ........................................................ 84/423 R
See application file for complete search history.

(56) References Cited

U.S. PATENT DOCUMENTS 6,054,641 A * 4/2000 Inoue ..................... G10H 1/344 84/172
7,816,598 B2 * 10/2010 Ishihara ................... G10C 3/12 84/423 R
11,410,635 B1 * 8/2022 Dileone, Jr. ............. G10C 3/12
2008/0066608 A1 * 3/2008 Osuga ...................... G10C 3/12 84/423 R
2013/0205971 A1 8/2013 Osuga et al.
2015/0082969 A1 * 3/2015 Suzuki ..................... G10C 3/12 84/433
2015/0114202 A1 * 4/2015 Suzuki ..................... G10C 3/18 84/236

FOREIGN PATENT DOCUMENTS

JP 2013167722 A 8/2013

* cited by examiner

*Primary Examiner* — Laura K Tso
(74) *Attorney, Agent, or Firm* — Meunier Carlin & Curfman LLC

(57) ABSTRACT

In a keyboard device, a white-key actuator and a black-key actuator are arranged so as not to coincide in position with each other in a front-rear direction. A common hammer member is employed for a white-key hammer and for a black-key hammer. The common hammer member is provided with a white-key sliding surface to be pressed by the white-key actuator and a black-key sliding surface to be pressed by the black-key actuator. The white-key sliding surface and the black-key sliding surface differ in position and/or shape from each other. The white-key sliding surface of the common hammer member is pressed by the white-key actuator at key-pressing of a white key, and the black-key sliding surface of the common hammer member is pressed by the black-key actuator at key-pressing of a black key.

12 Claims, 16 Drawing Sheets

KEYBOARD DEVICE

CROSS-REFERENCE TO RELATED APPLICATIONS

This application claims the benefits of Japanese Patent Application No. 2023-028594 filed on Feb. 27, 2023 with the Japan Patent Office and Japanese Patent Application No. 2023-031063 filed on Mar. 1, 2023 with the Japan Patent Office, the entire disclosures of which are incorporated herein by reference.

BACKGROUND

The present disclosure relates to a keyboard device that can be used in a keyboard instrument, such as an electronic piano.

For example, Japanese Unexamined Patent Application Publication No. 2013-167722 discloses a keyboard instrument including a keyboard device, and the keyboard device includes a keyboard and a keyboard chassis that supports the keyboard. This keyboard instrument is configured such that hammers are arranged under corresponding keys of the keyboard and such that, when a front-end part of each hammer is pressed by an actuator of the corresponding key at key-pressing, the hammer is moved pivotally, whereby a rear-end part thereof is raised.

Specifically, a black-key actuator is arranged under a black key, and a black-key hammer having a shape corresponding to a position and so on of the black-key actuator is arranged under the black key. When the black key is pressed, a front-end part of the black-key hammer is pressed by a leading end part of the black-key actuator.

Similarly, a white-key actuator is arranged under a white key, and a white-key hammer having a shape corresponding to a position and so on of the white-key actuator is arranged under the white key. At key-pressing of the white key, a front-end part of the white-key hammer is pressed by a leading end part of the white-key actuator.

SUMMARY

However, in the above-described technique disclosed in Japanese Unexamined Patent Application Publication No. 2013-167722, the black-key hammer having the shape corresponding to the black key is used, and separately, the white-key hammer having the shape corresponding to the white key is used, which leads to some problems.

Specifically, the above-described technique requires that parts (e.g., hammers) having mutually different structures be manufactured for the black keys and for the white keys, thus causing a problem of increased kinds of parts and a problem of complicated manufacturing process.

An object of one aspect of the present disclosure is to provide a technique that enables reduction of kinds of parts of a keyboard device and that enables simplification of a manufacturing process.

(1) One aspect of the present disclosure is a keyboard device comprising a keyboard in which keys are provided so as to be each pivotally movable, the keys comprising white keys and black keys, and a hammer configured to be pivotally moved by being pressed by an actuator of each key at key-pressing.

The keyboard device comprises, as elements related to the white keys, a white-key key-body extending in a front-rear direction, a white-key actuator extending downward from the white-key key-body, and a white-key hammer configured to be pivotally moved by being pressed by the white-key actuator at key-pressing of the white key. The keyboard device comprises, as elements related to the black keys, a black-key key-body extending in the front-rear direction, a black-key actuator extending downward from the black-key key-body, and a black-key hammer configured to be pivotally moved by being pressed by the black-key actuator at key-pressing of the black key.

Moreover, the white-key actuator and the black-key actuator are arranged so as not to coincide in position with each other in the front-rear direction, and a common hammer member is employed for the white-key hammer and for the black-key hammer.

The common hammer member is provided with a white-key sliding surface to be pressed by the white-key actuator and a black-key sliding surface to be pressed by the black-key actuator, and the white-key sliding surface and the black-key sliding surface are provided so as to differ in position and/or shape from each other.

Furthermore, the keyboard device is configured such that the white-key sliding surface of the common hammer member is pressed by the white-key actuator at key-pressing of each white key and such that the black-key sliding surface of the common hammer member is pressed by the black-key actuator at key-pressing of each black key.

Such a configuration enables reduction of kinds of parts of the keyboard device, and also enables simplification of a manufacturing process of the keyboard device.

Specifically, by employing the common hammer member for the white-key hammer and for the black-key hammer, the white-key sliding surface and the black-key sliding surface can be provided on the white-key hammer, and the white-key sliding surface and the black-key sliding surface can be provided on the black-key hammer.

In other words, employment of the common hammer member makes it possible to easily produce the white-key hammer and the black-key hammer each including the white-key sliding surface and the black-key sliding surface.

Accordingly, as compared with a case of manufacturing the white-key hammer and the black-key hammer separately, the kinds of parts of the keyboard device can be reduced, and the manufacturing process of the keyboard device can be simplified.

Furthermore, with the above-described configuration, when the white key is struck, the white-key actuator slides on the white-key sliding surface (i.e., the white-key sliding surface that differs in position and/or shape from the black-key sliding surface) of the common hammer member, whereby desired stroke and key touch feeling of the white key can be achieved. In this case, the black-key sliding surface is not used.

Similarly, when the black key is struck, the black-key actuator slides on the black-key sliding surface (i.e., the black-key sliding surface that differs in position and/or shape from the white-key sliding surface) of the common hammer member, whereby desired stroke and key touch feeling of the black key can be achieved. In this case, the white-key sliding surface is not used.

That is, by providing the white-key sliding surface and the black-key sliding surface of the common hammer member so as to differ in position (e.g., position in an up-down direction and/or in the front-rear direction) and shape (i.e., surface shape) from each other, the stroke and a load (i.e., the key touch feeling) at key-pressing of each of the white key and the black key can be adjusted easily.

For example, it is possible to easily meet a demand for increasing the stroke only in the black keys and/or a demand for reducing increase in load only in the black keys.

(2) In one aspect of the present disclosure, the white-key sliding surface and the black-key sliding surface may be formed so as to differ in inclination from each other, and/or, if shaped to be curved, the white-key sliding surface and the black-key sliding surface may be formed so as to differ in shape of a curve from each other.

Such differences in inclination and/or in shape of a curve between the white-key sliding surface and the black-key sliding surface make it possible to easily adjust the stroke and the key touch feeling at key-pressing of each of the white key and the black key as described above.

(3) In one aspect of the present disclosure, the white-key sliding surface and the black-key sliding surface may be divided by a level difference and provided so as to differ in position in a height direction.

This makes it possible to easily adjust the stroke and the key touch feeling at key-pressing of each of the white key and the black key as described above.

(4) In one aspect of the present disclosure, the common hammer member may be arranged on a front side of each of the white-key hammer and the black-key hammer, and a weight may be arranged on a rear-end side of each of the white-key hammer and the black-key hammer.

Such employment of the common hammer member for the white-key hammer and for the black-key hammer makes it possible to easily provide the white-key sliding surface and the black-key sliding surface on each of the white-key hammer and the black-key hammer.

(5) In one aspect of the present disclosure, a weight may be attached to a rear end of the common hammer member.

Such attachment of the weight to the rear end of the common hammer member makes it possible to easily produce the white-key hammer and the black-key hammer with a simple configuration.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

1. Entire Configuration

Figure 1:
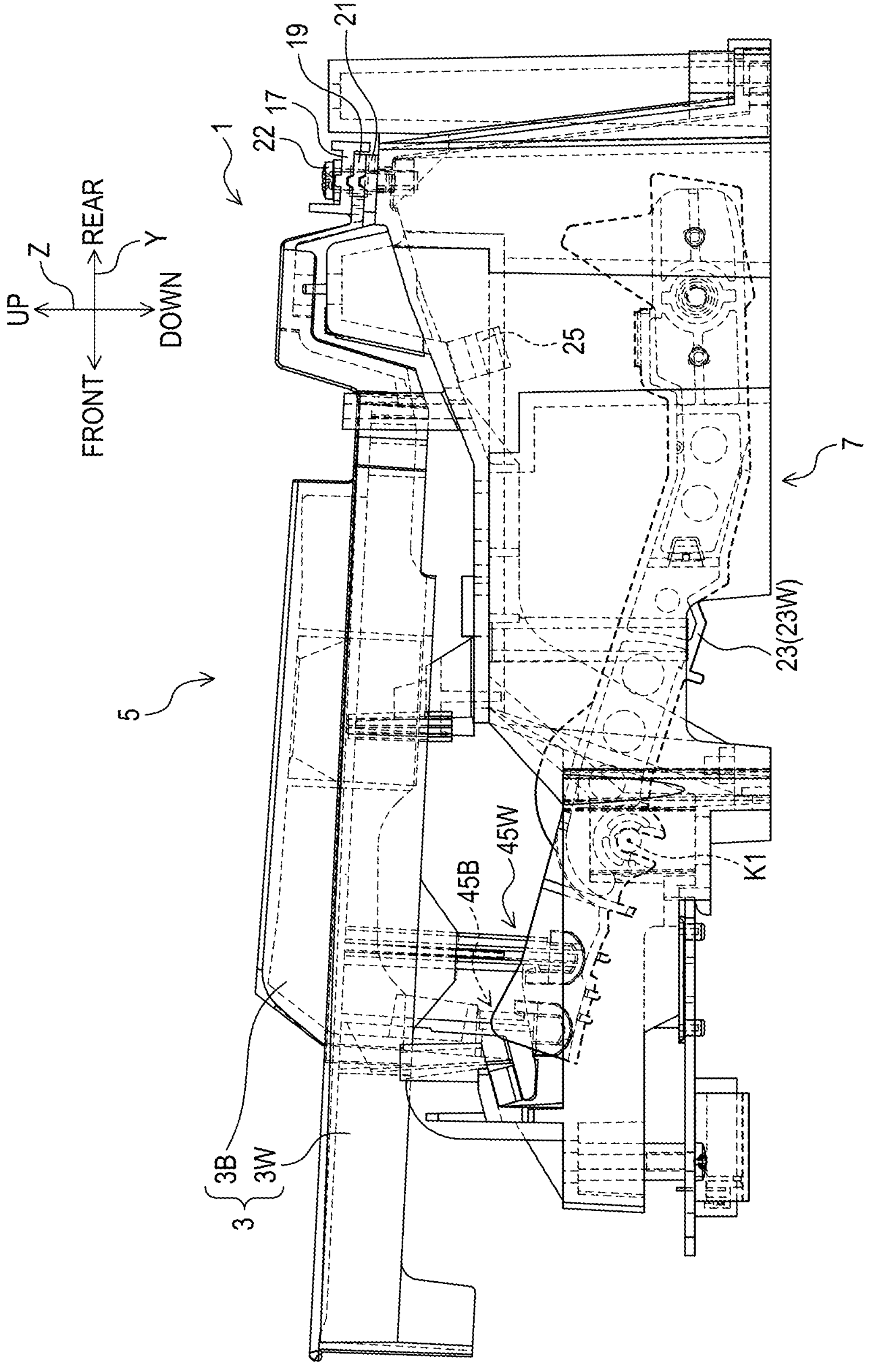
FIG. 1 is a side view of a keyboard device as viewed in a direction in which keys are arranged side by side.

As shown in FIG. 1, a keyboard device 1 of the present embodiment is used as, for example, a keyboard device for a keyboard instrument, such as an electronic piano.

The keyboard device 1 comprises a keyboard 5 in which respective keys 3, specifically white keys 3W and black keys 3B, are each arranged so as to be pivotally movable, and a keyboard chassis 7 that supports the keyboard 5.

Hereinafter, a member related to the white key 3W is assigned with a reference numeral including a symbol W, and a member related to the black key 3B is assigned with a reference numeral including a symbol B; however, the symbols W and B are not included in some cases where no distinction is made between the white key 3W and the black key 3B.

In FIG. 1 and other drawings, a front-rear direction corresponds to a Y-axis direction of an XYZ orthogonal coordinate system, an up-down direction (i.e., a vertical direction) corresponds to a Z-axis direction of the same system, and a direction perpendicular to a Y-axis and to a Z-axis (i.e., a left-right direction in which the keys 3 are arranged side by side) corresponds to an X-axis direction of the same system. Each drawing such as FIG. 1 shows the keyboard device 1 in a state placed on a horizontal plane.

Figure 2A:
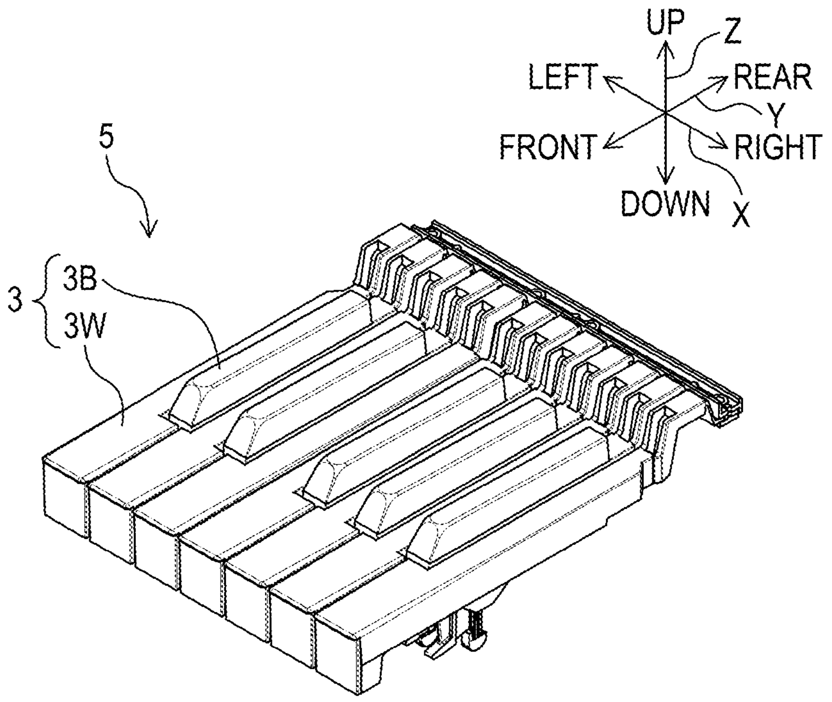
FIG. 2A is a perspective view showing a keyboard.

As shown in FIG. 2A depicting a part of the keyboard 5, the keyboard 5 comprises the keys 3 (i.e., the white keys 3W and the black keys 3B) arranged in the left-right direction.

Figure 2B:
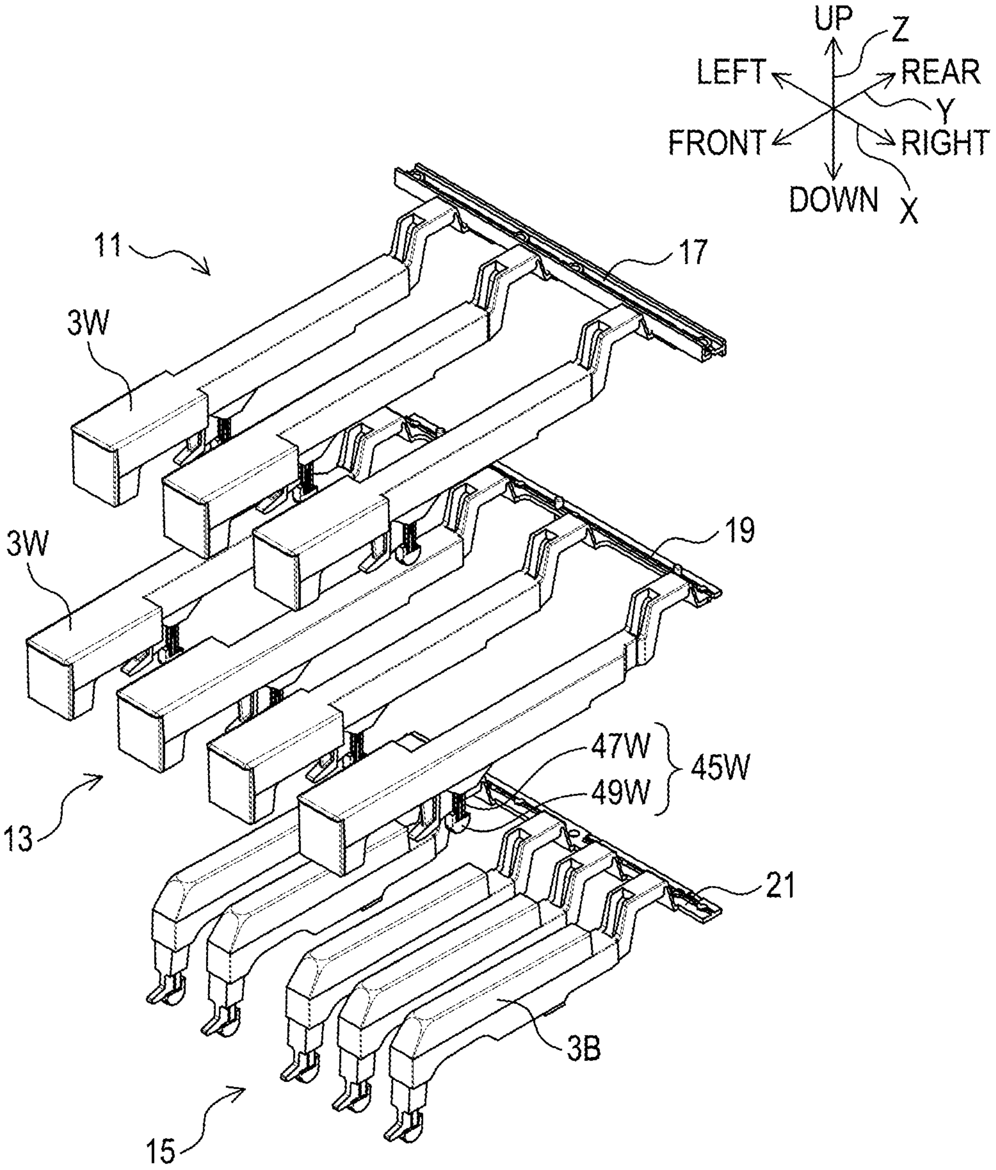
FIG. 2B is an exploded perspective view showing the keyboard in an exploded state.

As shown in FIG. 2B, the keyboard 5 may be configured by, for example, combining a white-key member 11 with the three white keys 3W integrated therein, another white-key member 13 with the four white keys 3W integrated therein, and a black-key member 15 with the five black keys 3B integrated therein.

The white-key members 11 and 13 and the black-key member 15 are each integrally formed of resin (e.g., ABS resin). The white-key members 11 and 13 are respectively provided with, at respective rear ends thereof, fixing parts 17 and 19 each extending in the left-right direction and having an elongated and substantially plate shape, and rear-end parts of the white keys 3W are integrally connected to the corresponding fixing parts 17 and 19. Similarly, the black-key member 15 is provided with, at a rear end thereof, a fixing part 21 extending in the left-right direction and having an elongated and substantially plate shape, and rear-end parts of the black keys 3B are integrally connected to the fixing part 21.

The fixing parts 17, 19, and 21 are stacked in the up-down direction and integrally fixed to the keyboard chassis 7 with a fixing member, such as a bolt 22 (see FIG. 1).

As shown in FIG. 1, arranged under the keyboard 5, for each key 3, is a hammer 23 that moves pivotally about a pivot point K1 in association with a key-pressing action on the key 3. Specifically, a white-key hammer 23W used at key-pressing of the white key 3W and a black-key hammer 23B (see FIG. 11) used at key-pressing of the black key 3B are arranged.

Arranged on a lower side of the white key 3W is a white-key actuator 45W that presses the white-key hammer 23W at key-pressing, and arranged on a lower side of the black key 3B is a black-key actuator 45B that presses the black-key hammer 23B at key-pressing. As will be described below, the white-key actuator 45W is arranged rearward of the black-key actuator 45B as viewed in the X-axis direction.

Figure 3A:
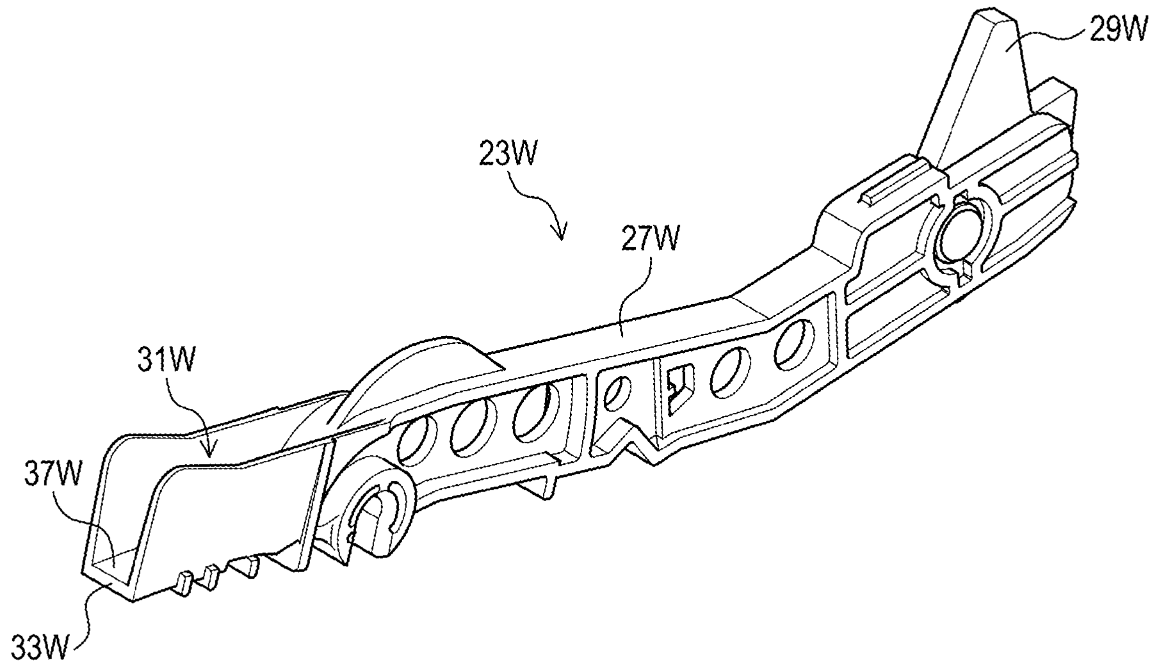
FIG. 3A is a perspective view of a white-key hammer.
Figure 3B:
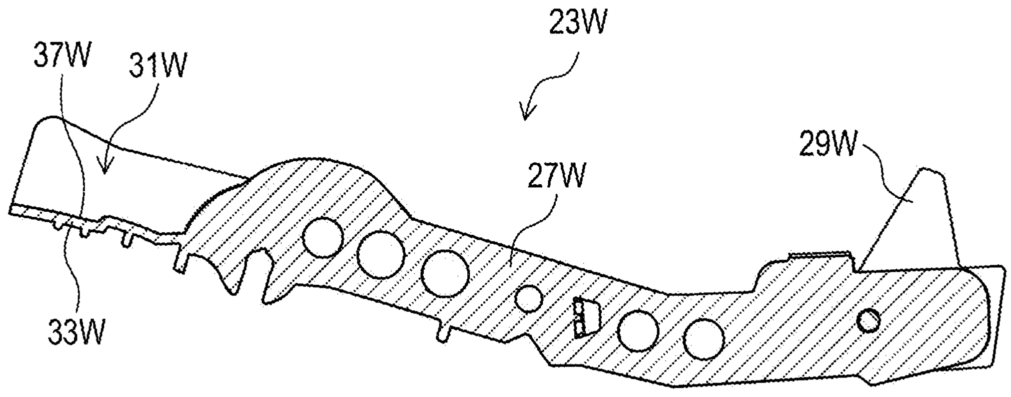
FIG. 3B is a sectional view of the white-key hammer taken along a YZ plane.
Figure 4:
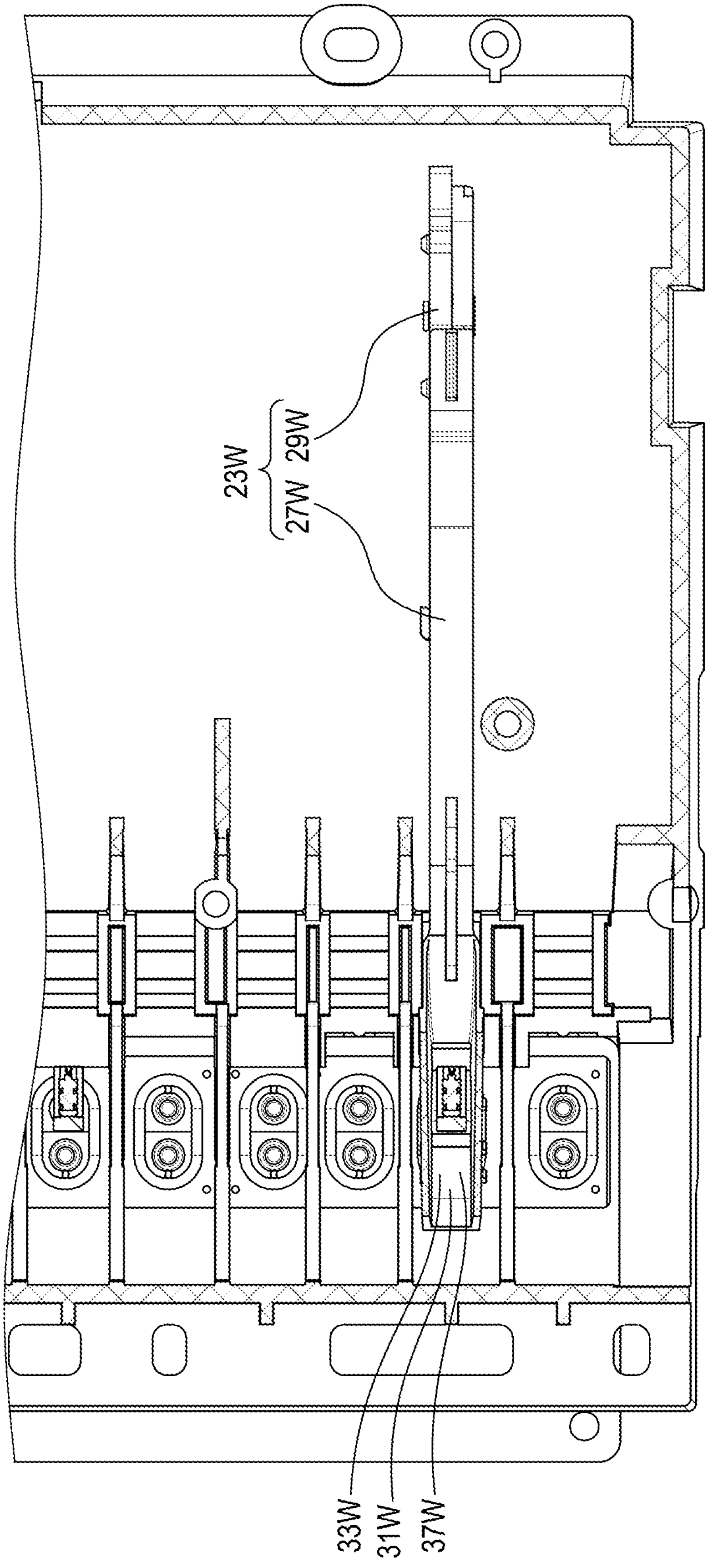
FIG. 4 is a sectional view showing a structure of the white-key hammer, taken along a line IV-IV in FIG. 5.

As shown in FIGS. 3A, 3B, and 4, the white-key hammer 23W comprises a hammer body 27W that is made of resin (e.g., polyacetal) and that has an elongated shape, and a weight 29W that is made of metal (e.g., iron) and that is attached to a rear end of the hammer body 27W. The hammer body 27W is a hammer member to be used in common.

As will be detailed below, provided to the white-key hammer 23W on its front-end side is a groove part 31W opened upward and frontward, and provided on a bottom part 33W of the groove part 31W is a sliding surface (hereinafter, an overall sliding surface) 37W, with which the white-key actuator 45W contacts and on which it slides. As will be described below, the black-key hammer 23B has almost the same configuration.

2. Elements Related to White Key

Figure 5:
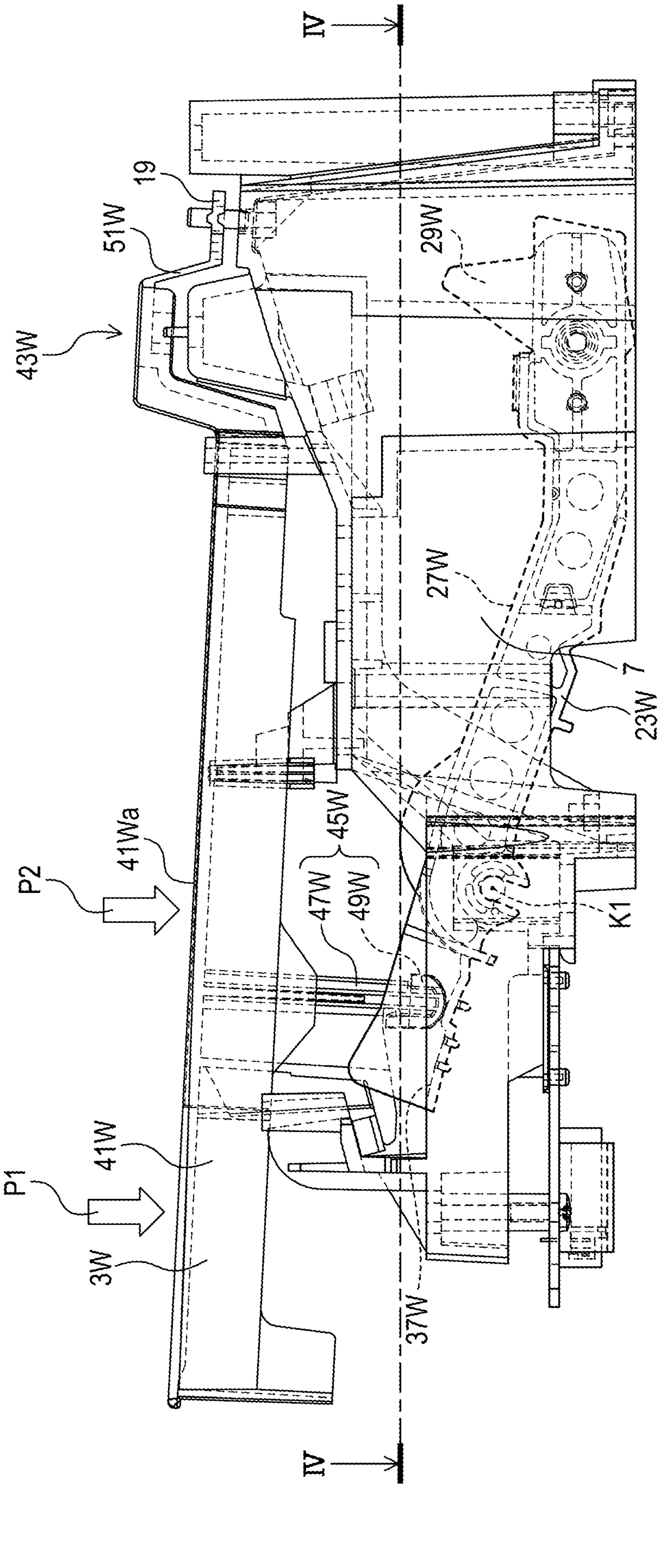
FIG. 5 is a side view showing a configuration of the keyboard device before key-pressing of the white key.
Figure 6:
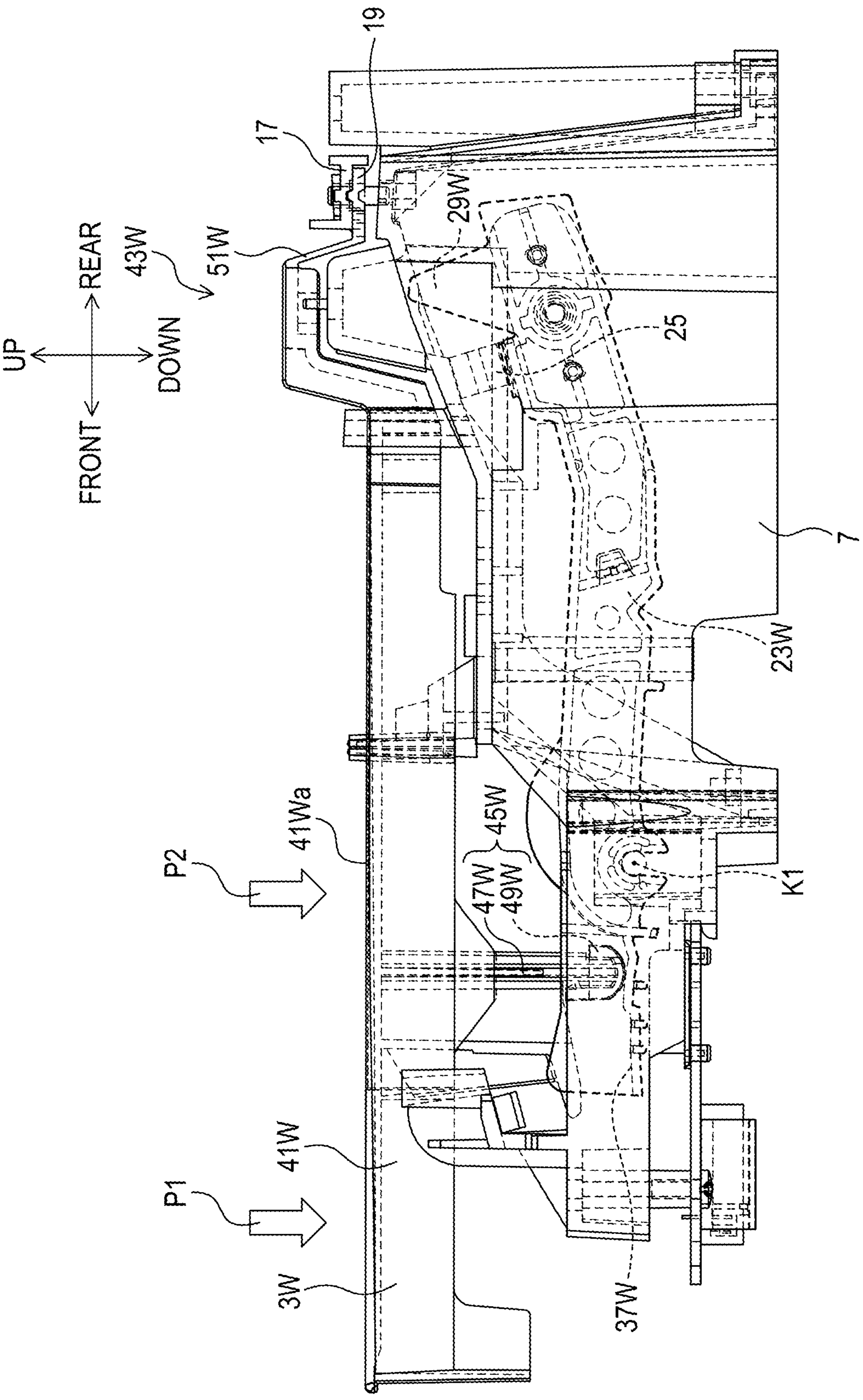
FIG. 6 is a side view showing a configuration of the keyboard device after key-pressing of the white key.

Next, elements related to the white key 3W are explained based on FIGS. 5 and 6. For the explanation here, the white-key member 13 is used as an example.

FIG. 5 shows the white key 3W before key-pressing, and thus, the weight 29W on a rear-end side of the white-key hammer 23W is in a lowered state. On the other hand, FIG. 6 shows the white key 3W after key-pressing, and thus, the weight 29W is in a raised state.

As shown in FIGS. 5 and 6, the white key 3W comprises a white-key key-body 41W extending in the front-rear direction, the fixing part 19 fixed to the keyboard chassis 7, and a connection part 43W that connects a rear end of the white-key key-body 41W and a front end of the fixing part 19 to each other. In FIGS. 5 and 6, elements related to the black key 3B are omitted.

As viewed in the X-axis direction, the connection part 43W has a shape bent so as to protrude upward of a plane containing an upper surface 41Wa of the white-key key-body 41W (i.e., a shape bent to be substantially trapezoidal so as to be opened downward). The connection part 43W comprises, on a rear side thereof, a hinge part 51W, which is a thin and plate-shaped member with elasticity.

On a bottom side of the white-key key-body 41W, the white-key actuator 45W is provided so as to protrude downward from the white-key key-body 41W perpendicularly to the white-key key-body 41W. The white-key actuator 45W comprises a column body 47W that has a columnar shape and protrudes downward from the white-key key-body 41W, and a leading end part 49W that has a substantially hemispherical shape and is attached to a leading end (i.e., a lower end) of the column body 47W.

A hemispherical surface of the leading end part 49W is in contact with the overall sliding surface 37W of the white-key hammer 23W before key-pressing, and has a function of pressing down a front-end part of the white-key hammer 23W while sliding on the overall sliding surface 37W in association with a key-pressing action.

As shown in FIG. 6, when the front-end part of the white-key hammer 23W is pressed down, the white-key hammer 23W moves pivotally about the pivot point K1 (i.e., moves pivotally in a counterclockwise direction), whereby a rear-end part (i.e., the weight 29W) of the white-key hammer 23W is raised.

<Configuration of Part to Actuate Hammer>

Here, a configuration of a part to pivotally move the white-key hammer 23W is described in detail.

Figure 7:
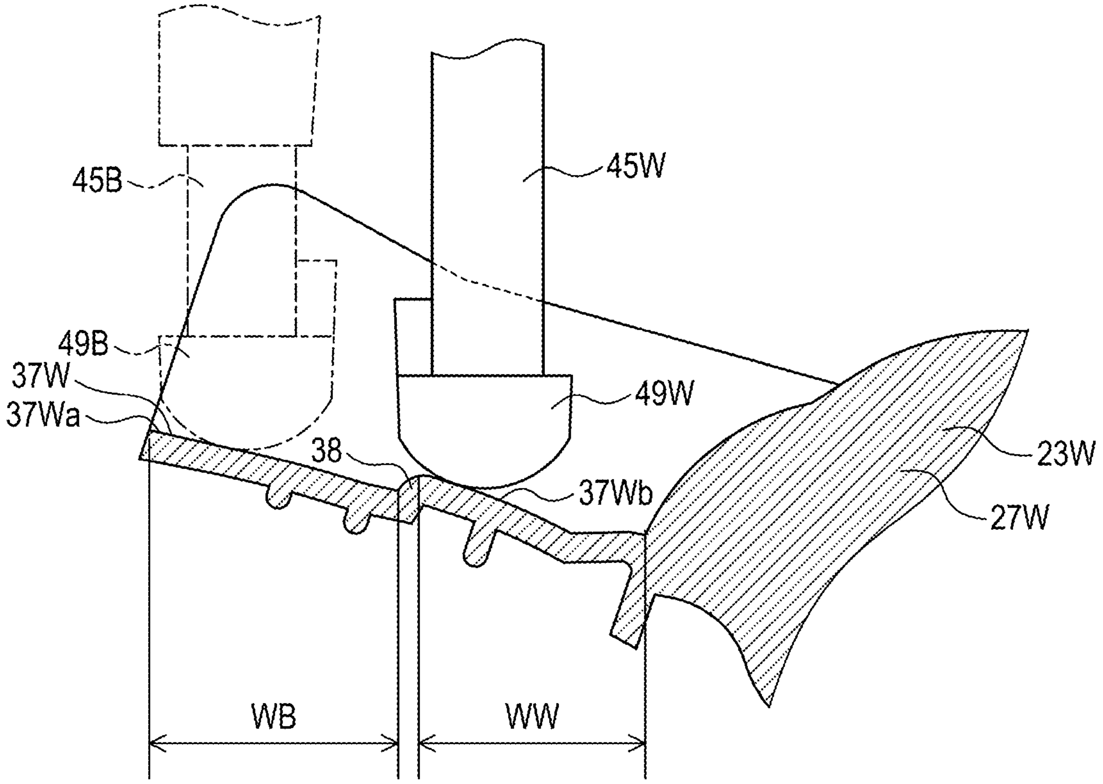
FIG. 7 is an explanatory diagram showing a configuration around a sliding surface of the white-key hammer in an enlarged manner.

As shown in FIG. 7, as viewed in the X-axis direction, the overall sliding surface 37W of the white-key hammer 23W comprises a front sliding surface (i.e., a black-key sliding surface) 37Wa on a front-end side and a rear sliding surface (i.e., a white-key sliding surface) 37Wb on a rear-end side.

The front sliding surface 37Wa and the rear sliding surface 37Wb are in mutually different positions (i.e., in positions different in the up-down direction and in the front-rear direction) and have mutually different surface shapes, with a level difference 38 arranged therebetween. In FIG. 7, WB represents a range of the front sliding surface 37Wa, and WW represents a range of the rear sliding surface 37Wb.

Specifically, the rear sliding surface 37Wb is a surface on which the leading end part 49W of the white-key actuator 45W slides and which is pressed down by the leading end part 49W to press down the front-end part of the white-key hammer 23W, at key-pressing of the white key 3W. In other words, the rear sliding surface 37Wb is a white-key sliding surface on which the leading end part 49W of the white-key actuator 45W actually slides, that is, a sliding surface actually used at key-pressing of the white key 3W.

The surface shape (e.g., inclination, and a shape of a curve) of the rear sliding surface 37Wb is set so that a stroke and a load (thus, a key touch feeling) at key-pressing of the white key 3W become desired ones. A surface on which the leading end part 49W actually slides is a part of the rear sliding surface 37Wb.

Although the overall sliding surface 37W of the white-key hammer 23W comprises the front sliding surface 37Wa and the rear sliding surface 37Wb in the present embodiment, only the rear sliding surface 37Wb is used at key-pressing of the white key 3W as described above. In other words, since the front sliding surface 37Wa is a sliding surface having a shape corresponding to the black-key hammer 23B, it is only the rear sliding surface 37Wb that is used at key-pressing of the white key 3W.

As is understood from the above description, a reason why the overall sliding surface 37W of the white-key hammer 23W comprises the front sliding surface 37Wa not used at key-pressing of the white key 3W is that a member (i.e., a hammer member) having the same shape as that of the hammer body 27W of the white-key hammer 23W is used as a hammer body 27B of the black-key hammer 23B, as will be described below (see, for example, FIG. 9).

In other words, since the hammer body 27W of the white-key hammer 23W has the same shape as that of the hammer body 27B of the black-key hammer 23B, the overall sliding surface 37W of the white-key hammer 23W and an overall sliding surface 37B (see FIG. 11) of the black-key hammer 23B have the same shape as each other.

Specifically, the front sliding surface 37Wa of the white-key hammer 23W and a front sliding surface 37Ba (see FIG. 13) of the black-key hammer 23B have the same shape as each other, and the rear sliding surface 37Wb of the white-key hammer 23W and a rear sliding surface 37Bb (see FIG. 13) of the black-key hammer 23B have the same shape as each other.

The white-key actuator 45W and the black-key actuator 45B do not coincide in position with each other in the front-rear direction. Thus, even though the hammer bodies 27W and 27B having the same shape include, respectively, the overall sliding surfaces 37W and 37B having the same shape, the white-key hammer 23W can be pressed to be pivotally moved by using the white-key actuator 45W, and the black-key hammer 23B can be pressed and pivotally moved by using the black-key actuator 45B.

As will be described below, the surface shape (e.g., inclination, and a shape of a curve) of each of the front sliding surfaces 37Wa and 37Ba is set so that a stroke and a key touch feeling of the black key 3B become desired ones. A surface on which a leading end part 49B actually slides is a part of each of the front sliding surfaces 37Wa and 37Ba.

<Effects of Inclination of Sliding Surfaces>

Next, an explanation is given of effects of inclination of the overall sliding surfaces 37W and 37B (specifically, the respective front sliding surfaces 37Wa and 37Ba and the respective rear sliding surfaces 37Wb and 37Bb in the overall sliding surfaces 37W and 37B). Since the effects of the inclination of the overall sliding surfaces 37W and 37B are similar to each other, for the explanation here, the overall sliding surface 37W (specifically, the rear sliding surface 37Wb) of the white-key hammer 23W is used as an example.

Figure 8A:
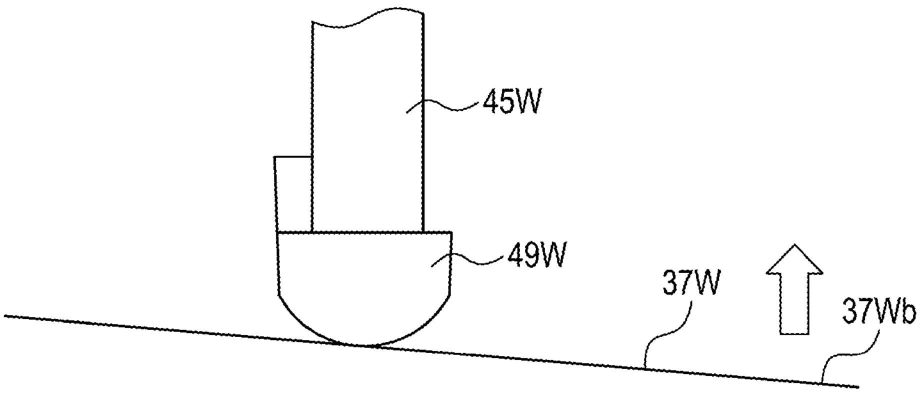
FIG. 8A is an explanatory diagram showing effects of inclination of the sliding surface of the white-key hammer.

As schematically shown in FIG. 8A, for example, in a case where the inclination of the rear sliding surface 37Wb is gentle, in other words, in a case of the rear sliding surface 37Wb that gently descends rearward, the following features (A) to (C) are observed:

(A) An amount of pivotal movement of the white-key hammer 23W (i.e., an amount of travel of the rear end thereof) is increased as compared with a case where the inclination is steep.

(B) A stroke of the white key 3W is decreased as compared with the case where the inclination is steep.

(C) Increase in load for the stroke of the white key 3W is large as compared with the case where the inclination is steep.

Figure 8B:
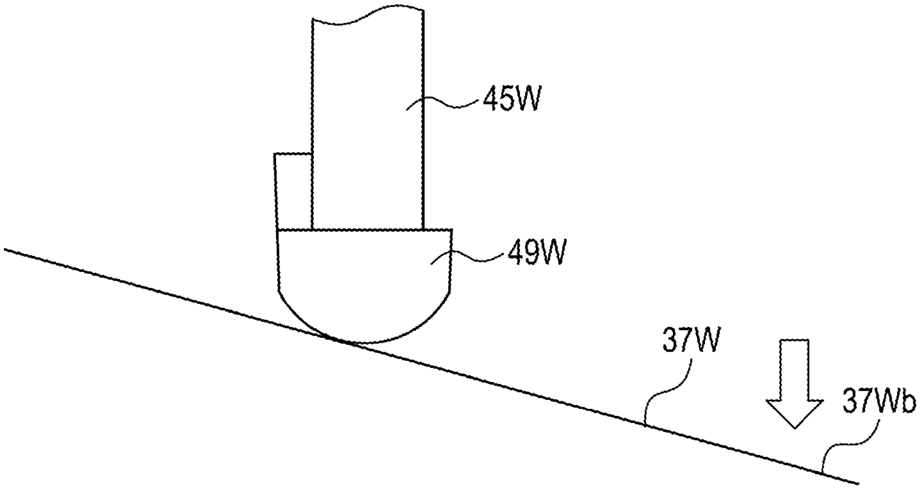
FIG. 8B is an explanatory diagram showing effects of inclination of the sliding surface of the white-key hammer.

In contrast, as schematically shown in FIG. 8B, for example, in a case where the inclination of the rear sliding surface 37Wb is steeper than that shown in FIG. 8A, in other words, in a case of the rear sliding surface 37Wb that steeply descends rearward, the following features (D) to (F) are observed:

(D) The amount of pivotal movement of the white-key hammer 23W (i.e., the amount of travel of the rear end thereof) is decreased as compared with a case where the inclination is gentle.

(E) The stroke of the white key 3W is increased as compared with the case where the inclination is gentle.

(F) The increase in load for the stroke of the white key 3W is small as compared with the case where the inclination is gentle.

<Action of White Key>

Next, overall action of the white key 3W is described based on FIGS. 5 and 6.

As shown in FIG. 5, in a state before key-pressing of the white key 3W, the leading end part 49W of the white-key actuator 45W is in contact with the overall sliding surface 37W (specifically, the rear sliding surface 37Wb) of the white-key hammer 23W.

In this state, for example when a front-side part of the white key 3W is pressed at or around a position, for example, as indicated by an arrow P1 or an arrow P2 (i.e., when key-pressing is started), a force pressing the white key 3W presses the overall sliding surface 37W (specifically, the rear sliding surface 37Wb) of the white-key hammer 23W via the white-key actuator 45W. This causes the white-key hammer 23W to move pivotally about the pivot point K1 to raise the rear-end part of the white-key hammer 23W.

The position indicated by the arrow P1 corresponds to a position forward of a position where the white-key actuator 45W is provided, and the position indicated by the arrow P2 corresponds to a position rearward of the position where the white-key actuator 45W is provided.

Then, as shown in FIG. 6, when the white key 3W is pressed to its lower limit, the overall sliding surface 37W (specifically, the rear sliding surface 37Wb) of the white-key hammer 23W is pressed down to its lower limit by the white-key actuator 45W, and thus, the rear-end part of the white-key hammer 23W is raised to hit a stopper 25, and a further raise is restricted.

3. Elements Related to Black Key

Next, the elements related to the black key 3B are explained based on FIGS. 9 to 13. For the elements similar to those related to the white key 3W, explanation is omitted or simplified.

Figure 9:
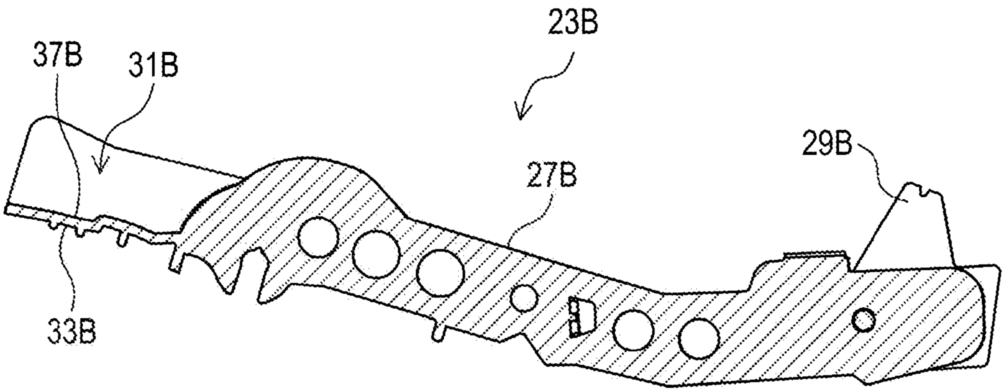
FIG. 9 is a sectional view of a black-key hammer taken along a YZ plane.
Figure 10:
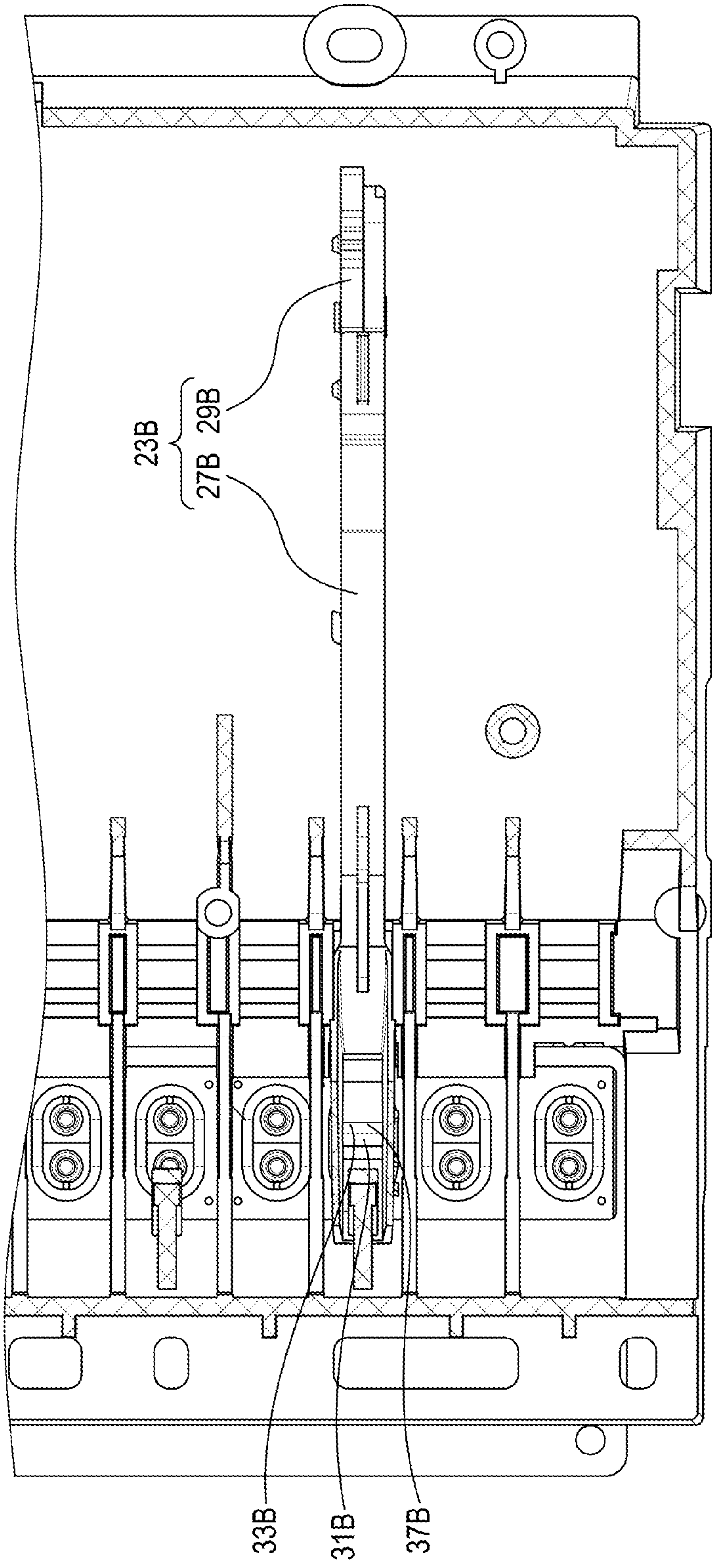
FIG. 10 is a sectional view showing a structure of the black-key hammer, taken along a line X-X in FIG. 11.

As shown in FIGS. 9 and 10, the black-key hammer 23B arranged for each black key 3B comprises the hammer body 27B and a weight 29B in a similar manner as in the white-key hammer 23W.

The hammer body 27B has a shape similar to that of the hammer body 27W, and comprises, on a front-end side of the hammer body 27B, a groove part 31B, a bottom part 33B, and the overall sliding surface 37B each having the same shape as that of, respectively, the groove part 31W, the bottom part 33W, and the overall sliding surface 37W of the hammer body 27W. The overall sliding surface 37B (specifically, the front sliding surface 37Ba) is a sliding surface on which the leading end part 49B of the black-key actuator 45B slides.

As shown in FIG. 10, a shape of the weight 29B for the black key 3B is slightly different from that of the weight 29W for the white key 3W, and the height of the weight 29B for the black key 3B at its upper end is smaller than that of the weight 29W for the white key 3W at its upper end.

Figure 11:
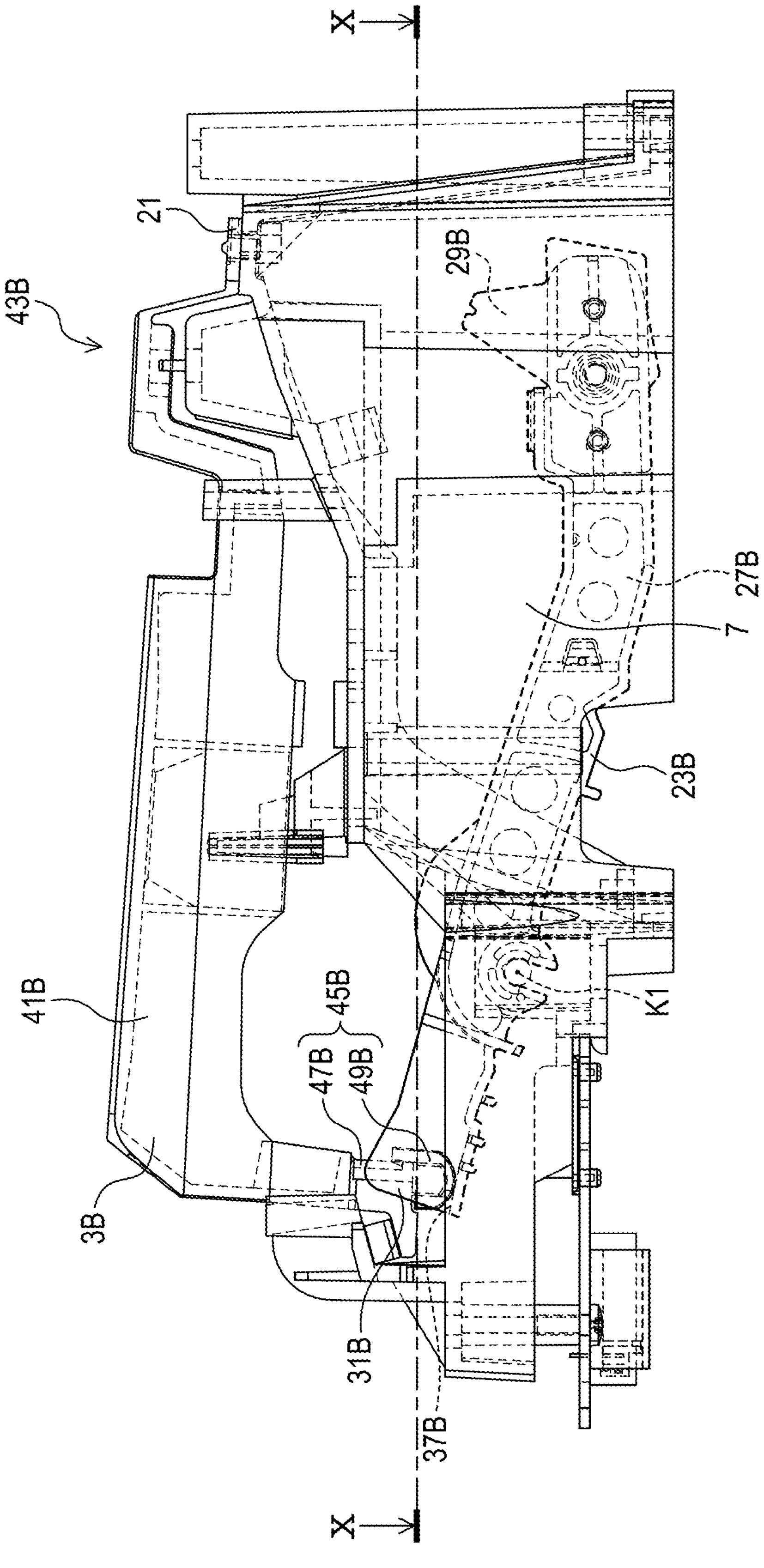
FIG. 11 is a side view showing a configuration of the keyboard device before key-pressing of a black key.
Figure 12:
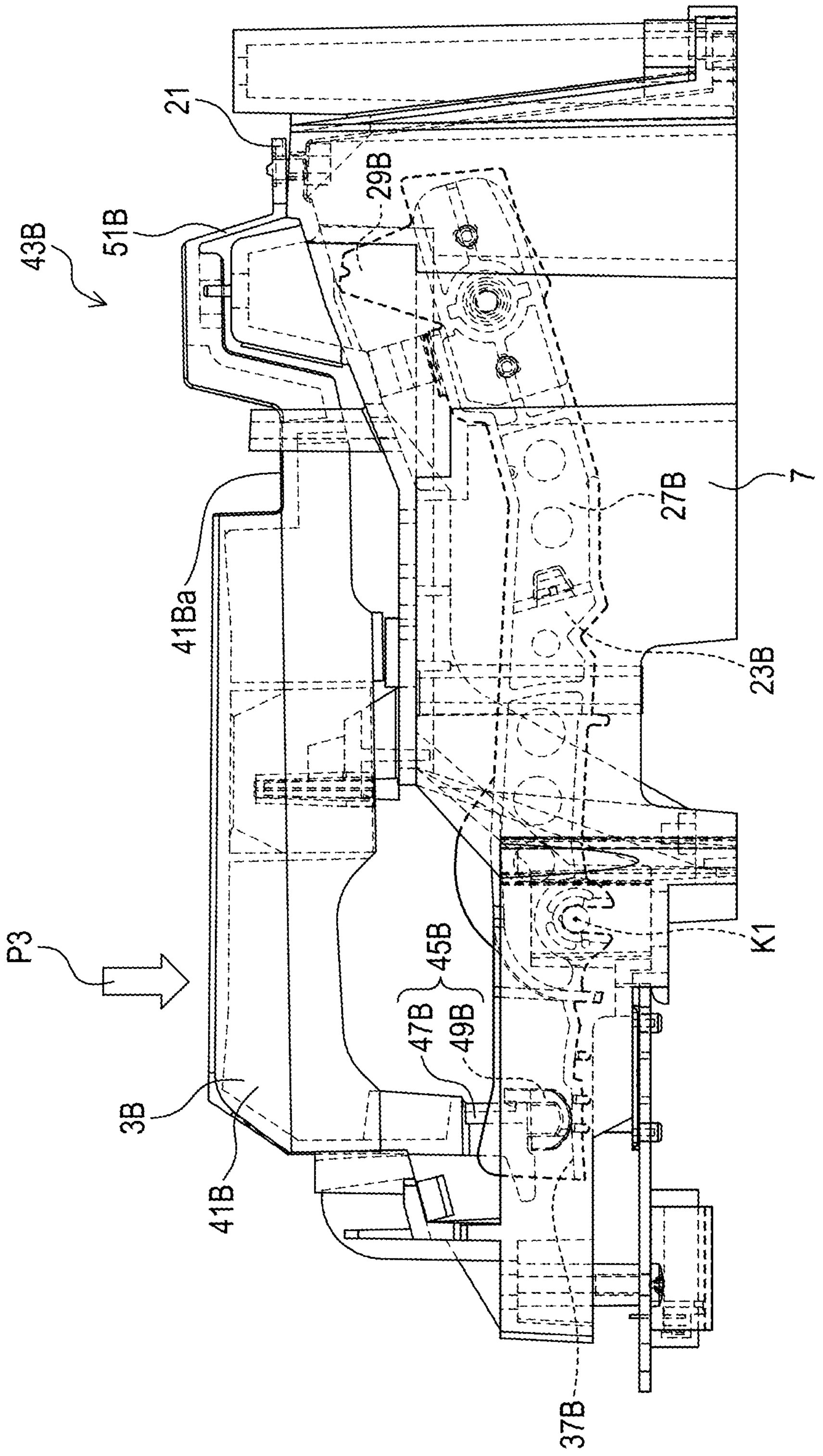
FIG. 12 is a side view showing a configuration of the keyboard device after key-pressing of the black key.

As shown in FIG. 11, the black key 3B comprises a black-key key-body 41B extending in the front-rear direction, the fixing part 21 fixed to the keyboard chassis 7, and a connection part 43B that connects a rear end of the black-key key-body 41B and a front end of the fixing part 21 to each other. In FIGS. 11 and 12, the elements related to the white key 3W are omitted.

On a bottom side of the black-key key-body 41B, the black-key actuator 45B is provided so as to protrude downward from the black-key key-body 41B perpendicularly to the black-key key-body 41B.

The black-key actuator 45B comprises a column body 47B that has a columnar shape and protrudes from the black-key key-body 41B, and the leading end part 49B that has a substantially hemispherical shape and is attached to a leading end (i.e., a lower end) of the column body 47B.

The leading end part 49B is in contact with the overall sliding surface 37B of the black-key hammer 23B before key-pressing, and has a function of pressing down a front-end part of the black-key hammer 23B while sliding on the overall sliding surface 37B in association with a key-pressing action.

As shown in FIG. 12, when the black key 3B is pressed down at or around a position indicated by an arrow P3, the black-key hammer 23B moves pivotally about the pivot point K1, whereby a rear-end part (i.e., the weight 29B) of the black-key hammer 23B is raised.

The connection part 43B has a shape bent so as to protrude upward in a similar manner as in the white key 3W. Specifically, the connection part 43B is similar in shape to the connection part 43W of the white key 3W as viewed in the X-axis direction, and protrudes upward of an upper surface 41Ba adjacent to the connection part 43B. The connection part 43B comprises, on a rear-end side thereof, a hinge part 51B, which is a thin and plate-shaped member with elasticity.

<Configuration of Part to Drive Hammer>

Here, a configuration of a part to pivotally move the black-key hammer 23B is described in detail; however, such a configuration is basically similar to the configuration of the part to pivotally move the white-key hammer 23W.

As described above, the hammer body 27B of the black-key hammer 23B has the same shape as that of the hammer body 27W of the white-key hammer 23W.

Figure 13:
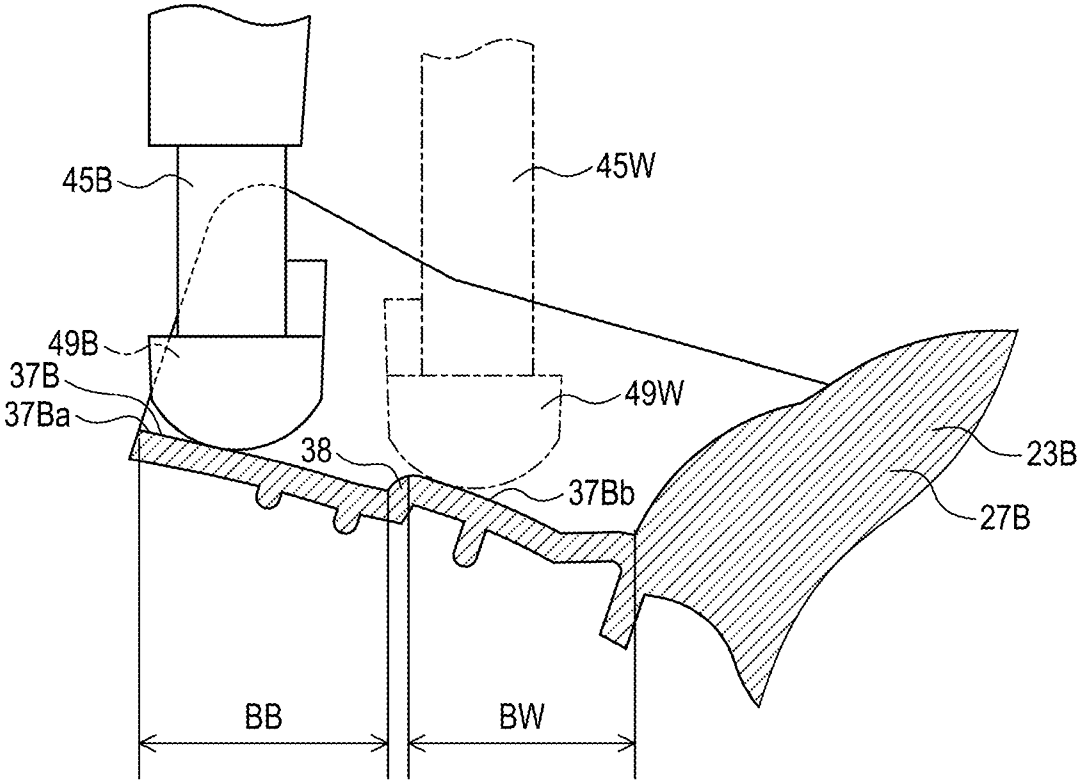
FIG. 13 is an explanatory diagram showing a configuration around a sliding surface of the black-key hammer in an enlarged manner.

Thus, as shown in FIG. 13, the overall sliding surface 37B of the black-key hammer 23B comprises the front sliding surface 37Ba on a front-end side and the rear sliding surface 37Bb on a rear-end side as viewed in the X-axis direction, similarly to the overall sliding surface 37W of the white-key hammer 23W, and the front sliding surface 37Ba and the rear sliding surface 37Bb have mutually different surface shapes with the level difference 38 arranged therebetween. In FIG. 13, BB represents a range of the front sliding surface 37Ba, and BW represents a range of the rear sliding surface 37Bb.

Specifically, the front sliding surface 37Ba is a surface on which the leading end part 49B of the black-key actuator 45B slides and which is pressed down by the leading end part 49B to press down the front-end part of the black-key hammer 23B, at key-pressing of the black key 3B. In other words, the front sliding surface 37Ba is a black-key sliding surface on which the leading end part 49B of the black-key actuator 45B actually slides, that is, a sliding surface actually used at key-pressing of the black key 3B.

<Action of Black Key>

Next, overall action of the black key 3B is described based on FIGS. 11 and 12.

As shown in FIG. 11, in a state before key-pressing of the black key 3B, the leading end part 49B of the black-key actuator 45B is in contact with the overall sliding surface 37B (specifically, the front sliding surface 37Ba) of the black-key hammer 23B.

In this state, for example when the black key 3B is pressed at or around the position indicated by the arrow P3 (see FIG. 12) (i.e., when key-pressing is started), a force pressing the black key 3B presses the overall sliding surface 37B (specifically, the front sliding surface 37Ba) of the black-key hammer 23B via the black-key actuator 45B. This causes the black-key hammer 23B to move pivotally about the pivot point K1 to raise the rear-end part of the black-key hammer 23B.

Then, as shown in FIG. 12, when the black key 3B is pressed to its lower limit, the overall sliding surface 37B (specifically, the front sliding surface 37Ba) of the black-key hammer 23B is pressed down to its lower limit by the black-key actuator 45B, and thus, the rear-end part of the black-key hammer 23B is raised to hit the stopper 25, and a further raise is restricted.

4. Effects

The embodiment detailed above produces effects described below.

(4a) In the present embodiment, the keyboard device 1 is configured as follows. The white-key actuator 45W and the black-key actuator 45B are arranged so as not to coincide in position with each other in the front-rear direction. For the white-key hammer 23W and the black-key hammer 23B, the hammer body 27W and the hammer body 27B, which are hammer members used in common (i.e., having the same shape), are respectively employed. The hammer body 27W and the hammer body 27B are respectively provided with the rear sliding surface (hereinafter, white-key sliding surface) 37Wb, 37Bb to be pressed by the white-key actuator 45W and the front sliding surface (hereinafter, black-key sliding surface) 37Wa, 37Ba to be pressed by the black-key actuator 45B to be different from each other in position and shape. At least one of the position or the shape can be made different between them.

Moreover, the keyboard device 1 is configured such that, at key-pressing of the white key 3W, the white-key sliding surface 37Wb of the hammer body 27W is pressed by the white-key actuator 45W, and configured such that, at key-pressing of the black key 3B, the black-key sliding surface 37Ba of the hammer body 27B is pressed by the black-key actuator 45B.

Such a configuration enables reduction of kinds of parts of the keyboard device 1, and also enables simplification of a manufacturing process of the keyboard device 1.

Specifically, by employing the hammer bodies 27W and 27B, which are hammer members used in common, for the white-key hammer 23W and the black-key hammer 23B, respectively, the white-key sliding surface 37Wb and the black-key sliding surface 37Wa can be provided on the white-key hammer 23W, and the white-key sliding surface 37Bb and the black-key sliding surface 37Ba can be provided on the black-key hammer 23B.

In other words, employment of such common hammer members makes it possible to easily produce the white-key hammer 23W including the white-key sliding surface 37Wb and the black-key sliding surface 37Wa, and the black-key hammer 23B including the white-key sliding surface 37Bb and the black-key sliding surface 37Ba. It is to be noted, in the common hammer member, that the white-key sliding surface 37Wb and the black-key sliding surface 37Wa in the overall sliding surface 37W are arranged so as not to coincide in position with each other in the front-rear direction to match the positions of the white-key actuator 45W and the black-key actuator 45B, respectively, and that the white-key sliding surface 37Bb and the black-key sliding surface 37Ba in the overall sliding surface 37B are arranged so as not to coincide in position with each other in the front-rear direction to match the positions of the white-key actuator 45W and the black-key actuator 45B, respectively.

Accordingly, as compared with a case of manufacturing the white-key hammer 23W and the black-key hammer 23B separately, the kinds of parts of the keyboard device 1 can be reduced, and the manufacturing process of the keyboard device 1 can be simplified.

Furthermore, with the above-described configuration, when the white key 3W is pressed, the white-key actuator 45W slides on the white-key sliding surface 37Wb of the hammer body 27W, whereby desired stroke and key touch feeling of the white key 3W can be achieved. In this case, the black-key sliding surface 37Wa of the hammer body 27W is not used.

Similarly, when the black key 3B is pressed, the black-key actuator 45B slides on the black-key sliding surface 37Ba of the hammer body 27B, whereby desired stroke and key touch feeling of the black key 3B can be achieved. In this case, the white-key sliding surface 37Bb of the hammer body 27B is not used.

That is, by providing the white-key sliding surface 37Wb, 37Bb to be different in position and shape from the black-key sliding surface 37Wa, 37Ba, respectively, the stroke and the load (i.e., the key touch feeling, which is a feeling at key-pressing) at key-pressing of each of the white key 3W and the black key 3B can be adjusted easily.

(4b) In the present embodiment, the white-key sliding surface 37Wb and the black-key sliding surface 37Wa in the overall sliding surface 37W are designed to differ in inclination and in shape of a curve from each other, and the white-key sliding surface 37Bb and the black-key sliding surface 37Ba in the overall sliding surface 37B are designed to differ in inclination and in shape of a curve from each other. At least one of the inclination or the shape can be made different between them.

Such differences in inclination and in shape of a curve between the white-key sliding surface 37Wb and the black-key sliding surface 37Wa in the overall sliding surface 37W and between the white-key sliding surface 37Bb and the black-key sliding surface 37Ba in the overall sliding surface 37B make it possible to easily adjust the stroke and the key touch feeling at key-pressing of each of the white key 3W and the black key 3B, respectively, as described above.

(4c) In the present embodiment, the white-key sliding surface 37Wb and the black-key sliding surface 37Wa in the overall sliding surface 37W are divided by the level difference 38 and provided so as to differ in position in a height direction, and the white-key sliding surface 37Bb and the black-key sliding surface 37Ba in the overall sliding surface 37B are divided by the level difference 38 and provided so as to differ in position in a height direction.

This makes it possible to easily adjust the stroke and the key touch feeling at key-pressing of each of the white key 3W and the black key 3B as described above.

(4d) In the present embodiment, the common hammer member is arranged on a front side of each of the white-key hammer 23W and the black-key hammer 23B, and the weight 29W and the weight 29B are arranged on a rear-end side of each of the white-key hammer 23W and the black-key hammer 23B, respectively.

Such employment of the common hammer member for the white-key hammer 23W and for the black-key hammer 23B enables easy provision of the white-key sliding surface 37Wb and the black-key sliding surface 37Wa on the white-key hammer 23W and easy provision of the white-key sliding surface 37Bb and the black-key sliding surface 37Ba on the black-key hammer 23B.

(4e) In the present embodiment, the weight 29W for the white key 3W or the weight 29B for the black key 3B is attached to the rear end of the common hammer member.

Such attachment of the weight 29W or the weight 29B to the rear end of the common hammer member makes it possible to easily produce the white-key hammer 23W and the black-key hammer 23B, respectively, with a simple configuration.

5. Other Embodiments

Although the embodiment of the present disclosure has been described so far, the present disclosure may take various forms without being limited to the above-described embodiment.

(5a) For example, the black-key actuator may be arranged rearward of the white-key actuator instead of being arranged forward of the white-key actuator.

(5b) Although the white-key sliding surface and the black-key sliding surface may each have a single surface shape (e.g., flat shape), two or more surface shapes may be combined. For example, a shape may be adopted in which a front-side part has a flat shape and a rear-side part has a curved shape.

(5c) Although the hammer body having the same shape is used for the white-key hammer and the black-key hammer as the common hammer member in the above-described embodiment, a different configuration may be adopted. For example, a common hammer member including the white-key sliding surface and the black-key sliding surface may be separately attached to a front end of the hammer body.

(5d) Although the common hammer member is used for a part of each of the white-key hammer and the black-key hammer in the above-described embodiment, the entirety of each of the white-key hammer and the black-key hammer may be configured with a common hammer member. In this case, it is preferable to adjust the pivot point and/or the weight (heaviness) for the white-key hammer and the black-key hammer as appropriate.

(5e) The white-key sliding surface and/or the black-key sliding surface may be varied in position and/or surface shape in a direction in which the keys are arranged (i.e., in the left-right direction). For example, the surface shape and so on may be varied between a treble side and a bass side of the keyboard. This makes it possible to vary a stroke and/or a key touch feeling between on the treble side and on the bass side of the keyboard.

It is also possible to design the white-key sliding surface and/or the black-key sliding surface to differ in position and/or shape for each musical range and/or scale.

(5f) Although the level difference is arranged between the white-key sliding surface and the black-key sliding surface in the above-described embodiment, the level difference may be omitted as long as the white-key sliding surface and the black-key sliding surface can be provided as separate surfaces.

(5g) A function/functions of a single element in the above-described embodiments may be distributed to two or more elements, and a function/functions of two or more elements may be performed by a single element in an integrated manner. A part of the configuration in the above-described embodiments may be omitted. At least a part of the configuration in the above-described embodiments may be added to or replace a configuration in other embodiments.

What is claimed is:

1. A keyboard device with a keyboard in which keys are provided so as to be each pivotally movable, the keys including white keys and black keys, the keyboard device comprising:

- elements related to the white keys, the elements related to the white keys including:
  - a white-key key-body extending in a front-rear direction;
  - a white-key actuator extending downward from the white-key key-body; and
  - a white-key hammer configured to be pivotally moved by being pressed by the white-key actuator at key-pressing of each white key, and
- elements related to the black keys, the elements related to the black keys including:
  - a black-key key-body extending in the front-rear direction;
  - a black-key actuator extending downward from the black-key key-body; and
  - a black-key hammer configured to be pivotally moved by being pressed by the black-key actuator at key-pressing of each black key, the white-key actuator and the black-key actuator being arranged so as not to coincide in position with each other in the front-rear direction, the white-key hammer and the black-key hammer each including a common hammer member, the common hammer member being provided with a white-key sliding surface to be pressed by the white-key actuator and a black-key sliding surface to be pressed by the black-key actuator, the white-key sliding surface and the black-key sliding surface being provided so as to differ in position and/or shape from each other, and the white-key sliding surface of the common hammer member being configured to be pressed by the white-key actuator at key-pressing of the white key, and the black-key sliding surface of the common hammer member being configured to be pressed by the black-key actuator at key-pressing of the black key.

2. The keyboard device according to claim 1, wherein the white-key sliding surface and the black-key sliding surface are formed so as to differ in inclination from each other.

3. The keyboard device according to claim 1, wherein the white-key sliding surface and the black-key sliding surface each have a curved shape, and the curved shape of the white-key sliding surface and the curved shape of the black-key sliding surface are different from each other.

4. The keyboard device according to claim 1, wherein the white-key sliding surface and the black-key sliding surface are divided by a level difference and provided so as to differ in position in a height direction.

5. The keyboard device according to claim 1, wherein the common hammer member is arranged on a front side of each of the white-key hammer and the black-key hammer, and a weight is arranged on a rear-end side of each of the white-key hammer and the black-key hammer.

6. The keyboard device according to claim 1, wherein a weight is attached to a rear end of the common hammer member.

7. The keyboard device according to claim 2, wherein the common hammer member is arranged on a front side of each of the white-key hammer and the black-key hammer, and a weight is arranged on a rear-end side of each of the white-key hammer and the black-key hammer.

8. The keyboard device according to claim 2, wherein a weight is attached to a rear end of the common hammer member.

9. The keyboard device according to claim 3, wherein the common hammer member is arranged on a front side of each of the white-key hammer and the black-key hammer, and a weight is arranged on a rear-end side of each of the white-key hammer and the black-key hammer.

10. The keyboard device according to claim 3, wherein a weight is attached to a rear end of the common hammer member.

11. The keyboard device according to claim 4, wherein the common hammer member is arranged on a front side of each of the white-key hammer and the black-key hammer, and a weight is arranged on a rear-end side of each of the white-key hammer and the black-key hammer.

12. The keyboard device according to claim 4, wherein a weight is attached to a rear end of the common hammer member.

* * * * *